(12) United States Patent
Geerligs

(10) Patent No.: US 9,055,718 B2
(45) Date of Patent: Jun. 16, 2015

(54) ROOT WATERING DEVICE

(75) Inventor: Steven David Geerligs, Vail, AZ (US)

(73) Assignee: Rain Bird Corporation, Azusa, CA (US)

( * ) Notice: Subject to any disclaimer, the term of this patent is extended or adjusted under 35 U.S.C. 154(b) by 245 days.

(21) Appl. No.: 13/405,114

(22) Filed: Feb. 24, 2012

(65) Prior Publication Data

US 2013/0219786 A1  Aug. 29, 2013

(51) Int. Cl.
*A01G 29/00* (2006.01)

(52) U.S. Cl.
CPC .................................... *A01G 29/00* (2013.01)

(58) Field of Classification Search
USPC .......................................................... 47/48.5
See application file for complete search history.

(56) References Cited

U.S. PATENT DOCUMENTS

| | | | |
|---|---|---|---|
| 419,242 A | 1/1890 | Brown | |
| 3,333,773 A | 8/1967 | Hutchinson | |
| 3,755,966 A | 9/1973 | Smith | |
| 4,153,380 A | 5/1979 | Hartman | |
| 4,578,897 A | 4/1986 | Pazar | |
| 4,685,827 A | 8/1987 | Sibbel | |
| 4,697,952 A | 10/1987 | Maddock | |
| 4,726,143 A | 2/1988 | Steinbeck | |
| 4,739,789 A | 4/1988 | Hamilton | |
| 4,765,541 A | 8/1988 | Mangels | |
| 5,097,626 A | 3/1992 | Mordoch | |
| 5,294,212 A | 3/1994 | Mehoudar | |
| 5,761,846 A | 6/1998 | Marz | |
| RE35,857 E | 7/1998 | Mehoudar | |
| 5,795,100 A | 8/1998 | Thomas | |
| 5,809,692 A | 9/1998 | Kesler | |
| 5,924,240 A | 7/1999 | Harrison | |
| 5,956,899 A | 9/1999 | DiOrio | |
| 5,975,797 A | 11/1999 | Thomas | |
| 5,996,279 A | 12/1999 | Zayeratabat | |
| 6,161,776 A | 12/2000 | Byles | |
| 6,540,436 B2 | 4/2003 | Ogi | |
| 6,984,090 B2 | 1/2006 | Allen | |
| 7,059,367 B2 | 6/2006 | Atkinson | |
| D524,611 S | 7/2006 | Liu | |
| D527,439 S | 8/2006 | Liu | |
| D527,791 S | 9/2006 | Onofrio | |
| 7,707,770 B2 | 5/2010 | Liu | |
| 8,065,832 B2 | 11/2011 | King | |
| 8,371,065 B2 * | 2/2013 | Peterson | 47/48.5 |
| 8,533,995 B1 * | 9/2013 | Behbehani | 47/79 |
| 2004/0074997 A1 | 4/2004 | Sacks | |
| 2004/0108391 A1 | 6/2004 | Onofrio | |
| 2004/0195360 A1 | 10/2004 | Walker | |
| 2005/0040256 A1 | 2/2005 | Santos | |
| 2005/0274071 A1 | 12/2005 | Allen | |

(Continued)

FOREIGN PATENT DOCUMENTS

| | | |
|---|---|---|
| FR | 2556929 | 6/1985 |
| WO | WO2006112802 | 10/2006 |

*Primary Examiner* — Kristen C Hayes
(74) *Attorney, Agent, or Firm* — Fitch, Even, Tabin & Flannery, LLP

(57) ABSTRACT

A deep root watering unit is described herein that includes an elongated hollow sleeve member and a grate-retaining housing mounted at an upper end of the sleeve member. A cap configured as a grate can be attached to the top portion of the housing. The deep root watering unit is advantageously configured to facilitate insertion and removal of the cap, irrigation adjacent to the housing, and/or distribution of fluid to adjacent irrigation devices.

20 Claims, 7 Drawing Sheets

(56) References Cited

U.S. PATENT DOCUMENTS

| | | |
|---|---|---|
| 2006/0112626 A1 | 6/2006 | Liu |
| 2008/0025796 A1 | 1/2008 | Allen |
| 2009/0031626 A1* | 2/2009 | Peterson ........................ 47/48.5 |
| 2011/0056128 A1 | 3/2011 | King |

* cited by examiner

ROOT WATERING DEVICE

FIELD

A root watering device is described herein and, in particular, a root watering device for providing water, air and/or nutrients below ground or grade level to the roots of plants or trees.

BACKGROUND

Underground root watering systems are used to more effectively deliver water, air and/or nutrients to the roots of plants and trees especially when water from above ground does not effectively infiltrate the soil profile. Inadequate water permeability is typically due to extreme soil texture conditions, typical of clay or silty clay soil types or hard paved urban areas. Additionally, those environments with arid climate conditions that do not produce sufficient precipitation and that cause rapid evaporation.

Root watering systems have a network of water supply piping placed at or below ground level. One or more root watering units may be placed in the vicinity of each plant and connected to the supply piping. The conventional root watering unit has a porous cylinder with an end cap. The cylinder is buried in the ground such that the cap is on grade level or is buried just below grade level. A hook-up conduit extends laterally through a hole in the porous cylinder to attach to the supply piping. The hook-up conduit connects to an interior conduit (whether straight or elbow shaped) extending within the cylinder toward the cap.

In one known form, a check valve used to prevent debris laden non-potable water from entering the emitting orifices of the irrigation device, and a filter are placed within the interior conduit. The outlet end of the interior conduit connects to a fluid emitter, which in turn, is held by supporting structure on the cap. In another form, a separate valve piece is connected to the outlet end of the interior conduit and within the cylinder. A filter is placed within the outlet end of the valve piece, while the fluid emitter is connected to the outlet end of the valve piece and secures the valve piece to the cap.

These conventional root watering units are relatively difficult to assemble, especially in the field, due to the number of separate pieces and their position within the assembly. They also are difficult to assemble because the check valve and other parts connected to the fluid line are positioned deep within the porous cylinder. To assemble the unit, the interior conduit is aligned with the hole on the sidewall of the porous cylinder and then connected to the hook-up conduit extending through the hole. This conduit joint is within the cylinder. The valve and other parts are then assembled to the interior conduit before the cap can be placed on the cylinder. This process also involves the installer matching the length of the interior conduit with the distance from the valve piece or cap to the hole on the cylinder for receiving the hook-up conduit. These steps all result in a relatively cumbersome and labor intensive process. Due to this design, routine maintenance is very time consuming with these known root watering units. For example, the units are removed from the ground in order to clean or adjust the check valve. This is because the valve is not easily accessible by just simply removing the end cap from the cylinder.

SUMMARY

A deep root watering unit is described herein that includes an elongated hollow sleeve member and a grate-retaining housing mounted at an upper end of the sleeve member. A cap configured as a grate can be attached to the top portion of the grate-retaining housing. The deep root watering unit is advantageously configured to facilitate insertion and removal of the cap, irrigation adjacent to the housing, and/or distribution of fluid to adjacent irrigation devices.

The elongated hollow sleeve member is adapted for in-ground placement to extend generally vertically at a position adjacent roots of a selected plant. The sleeve member has a plurality of water flow openings formed therein for passage of water from within the sleeve member to surrounding soil to irrigate the selected plant. The grate-retaining housing defines an internal chamber with a mount for supporting an irrigation water dispensing device, such as a bubbler, emitter or distribution manifold.

In order to facilitate insertion and removal of the cap, an upper end portion of the housing has at least one integrally formed retention clip for releasably securing the grate cap relative to the grate-retaining housing. The retention clips can be configured to resiliently flex outwardly to permit insertion and removal of the grate cap, and can be configured such that insertion of the grate cap causes the clips to flex outwardly and, once the grate cap is inserted, return toward their unflexed position. Providing an integral retention clip can advantageously eliminate the need for use of a separate tool and mechanism for securing the grate cap.

In another aspect, the grate cap can be installed in a recessed configuration within the grate-retaining housing, thus providing perimeter protection to the grate cap. When the grate cap is recessed, the retention clips can protrude above its top surface. A perimeter shield can be provided to protect such protruding retention clips, and the shield can optionally be a raised part of the peripheral lip of the grate-retaining housing.

In another aspect, the grate-retaining housing and grate cap can cooperate to form a flush path for flushing debris through the unit. The grate cap can be supported in substantially spaced relation from an inwardly extending ledge of the housing such that the flush path for debris is formed between the ledge and the grate cap for flushing debris that might otherwise become caught between the underside of the grate cap and the grate-retaining housing. The grate cap can include a generally planar grate surface with downwardly extending ribs, whereby the ribs are configured to support the outer lip of the grate cap in spaced relation from the ledge.

In order to facilitate irrigation adjacent to the grate-retaining housing, and throughout the entire height of the porous cylinder, one or more inclined ramps function to direct water outwardly for flow through at least one aperture in the grate-retaining housing. The ramps can be formed as channels on spokes that support the mount for an irrigation device. An internal reservoir is formed from an inwardly-extending ledge and from the sidewall of the grate-retaining housing and can be outfitted with the apertures. The apertures can optionally be downward facing, e.g., in a direction parallel to a longitudinal axis extending through the unit. One of the spokes supporting the mount can include an internal fluid passage for supplying fluid to the mount. An inclined ramp can be formed on such a spoke, and can be in the form of a groove formed in an exterior thereof for containing and directing water toward the reservoir. Close-in and elevated irrigation can be accomplished by capturing fluid from within the grate-retaining housing and, using the inclined ramps, directing fluid through the apertures of the reservoir of the housing for irrigating adjacent areas. This arrangement advantageously captures a portion of the fluid that otherwise could fall to the bottom of the porous member and uses such captured fluid for elevated irrigation.

In order to facilitate distribution of fluid to adjacent irrigation devices, the mount of the housing can be adapted to supply fluid to a removable distribution manifold. The manifold can have an inlet port fluidly connected to the mount and a plurality of outlet ports. The outlet ports can each be adapted for coupling to a flexible irrigation line, which can then be coupled at its other end to another irrigation device separate or external from the deep root watering unit. The housing can include one or more openings in its sidewall through which the irrigation line can extend to couple to the other irrigation devices in a subsurface manner.

DETAILED DESCRIPTION OF THE DRAWINGS

Figure 1:
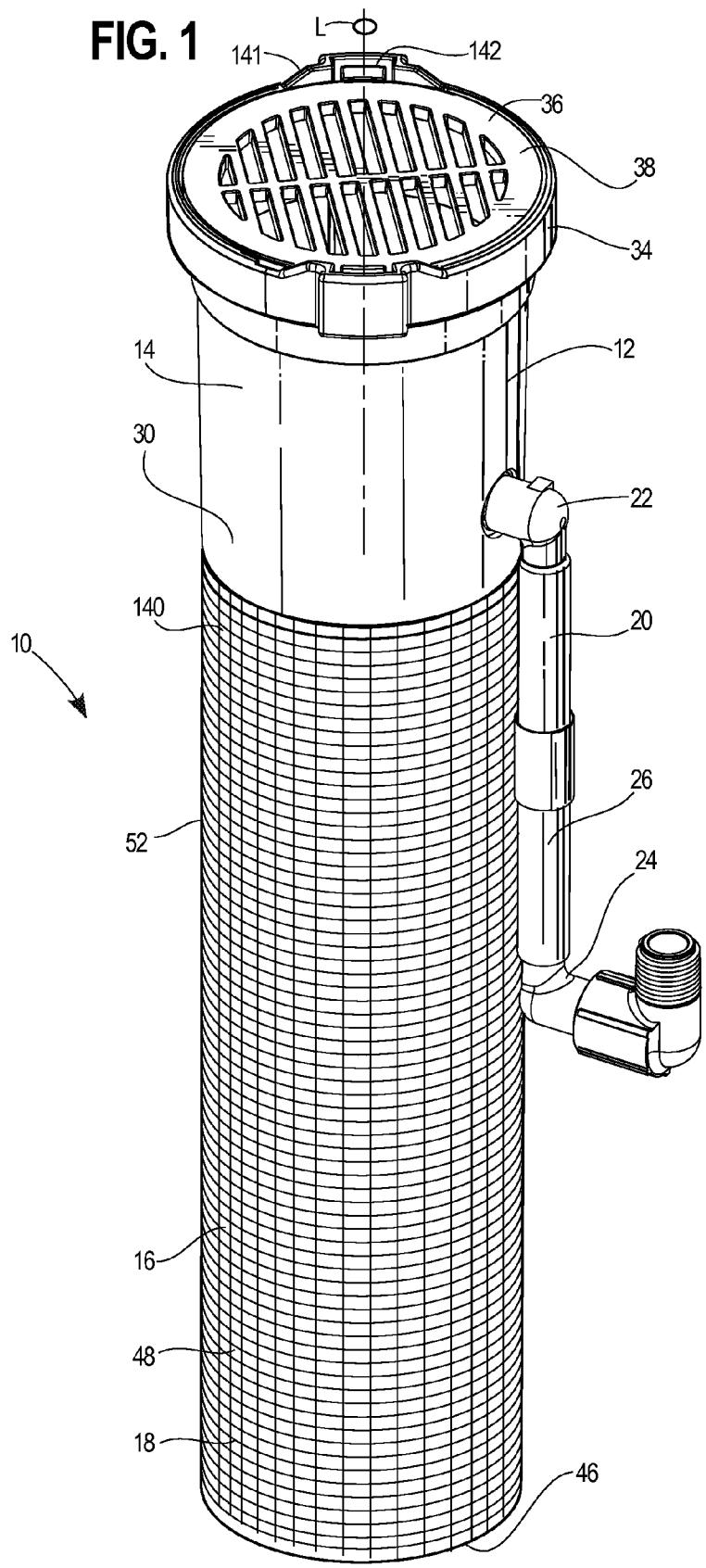
FIG. 1 is a perspective view of a root watering device having an upper grate-retaining housing with a water bubbler mounted therein and a lower, cylindrical porous body.
Figure 2:
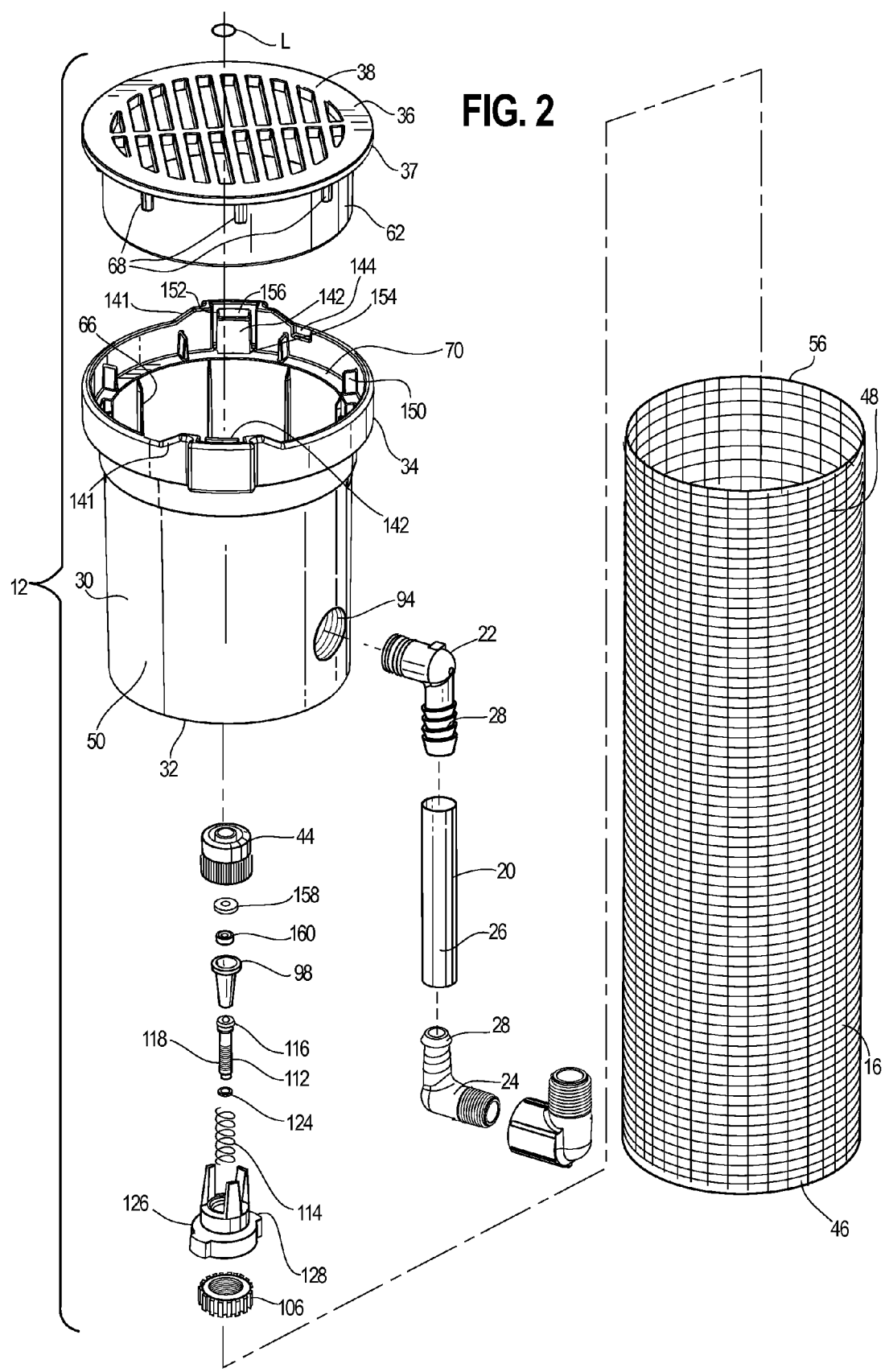
FIG. 2 is an exploded perspective view of the root watering device of FIG. 1.
Figure 3:
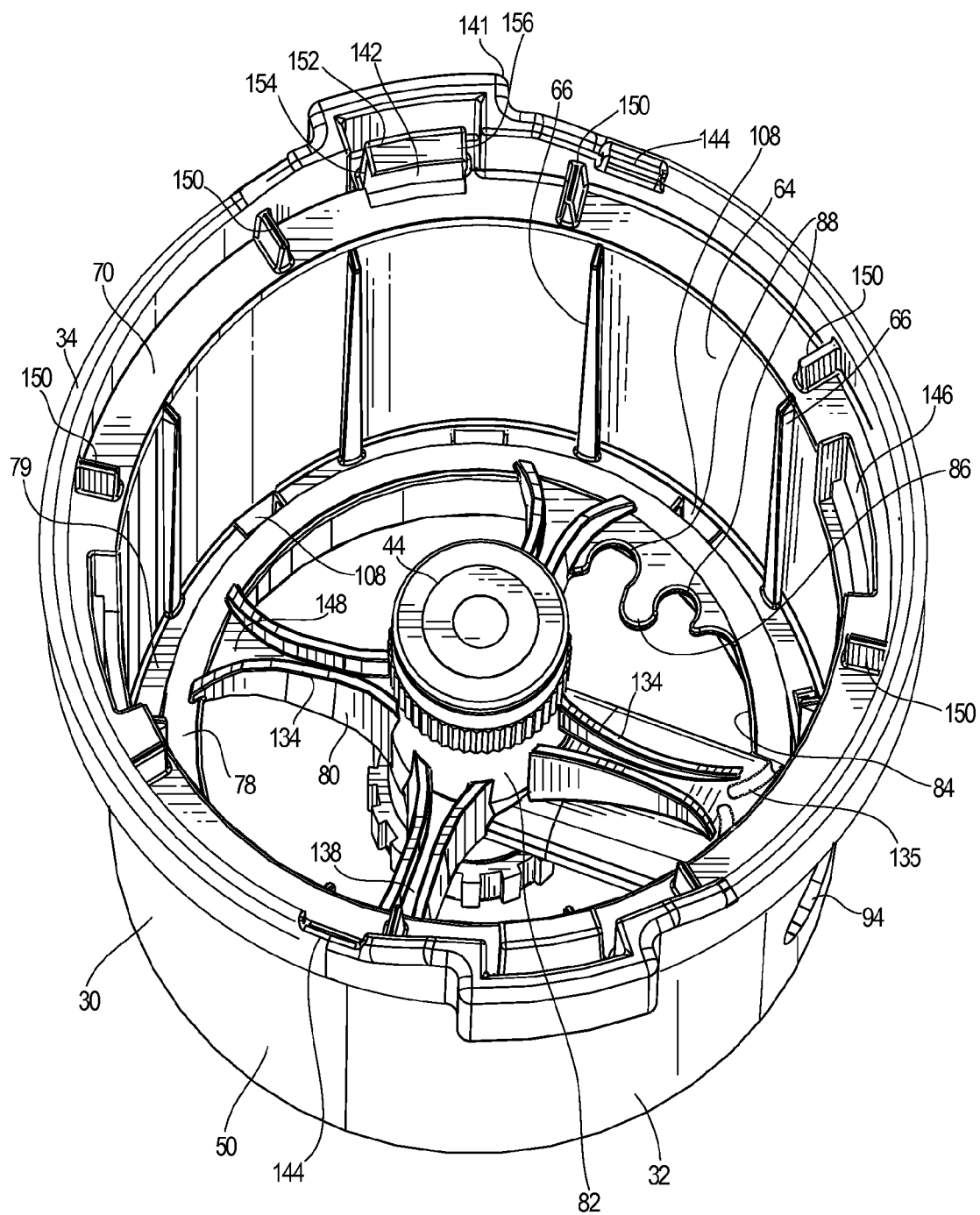
FIG. 3 is an upper perspective view of the grate-retaining housing of the root watering device of FIG. 1.
Figure 4:
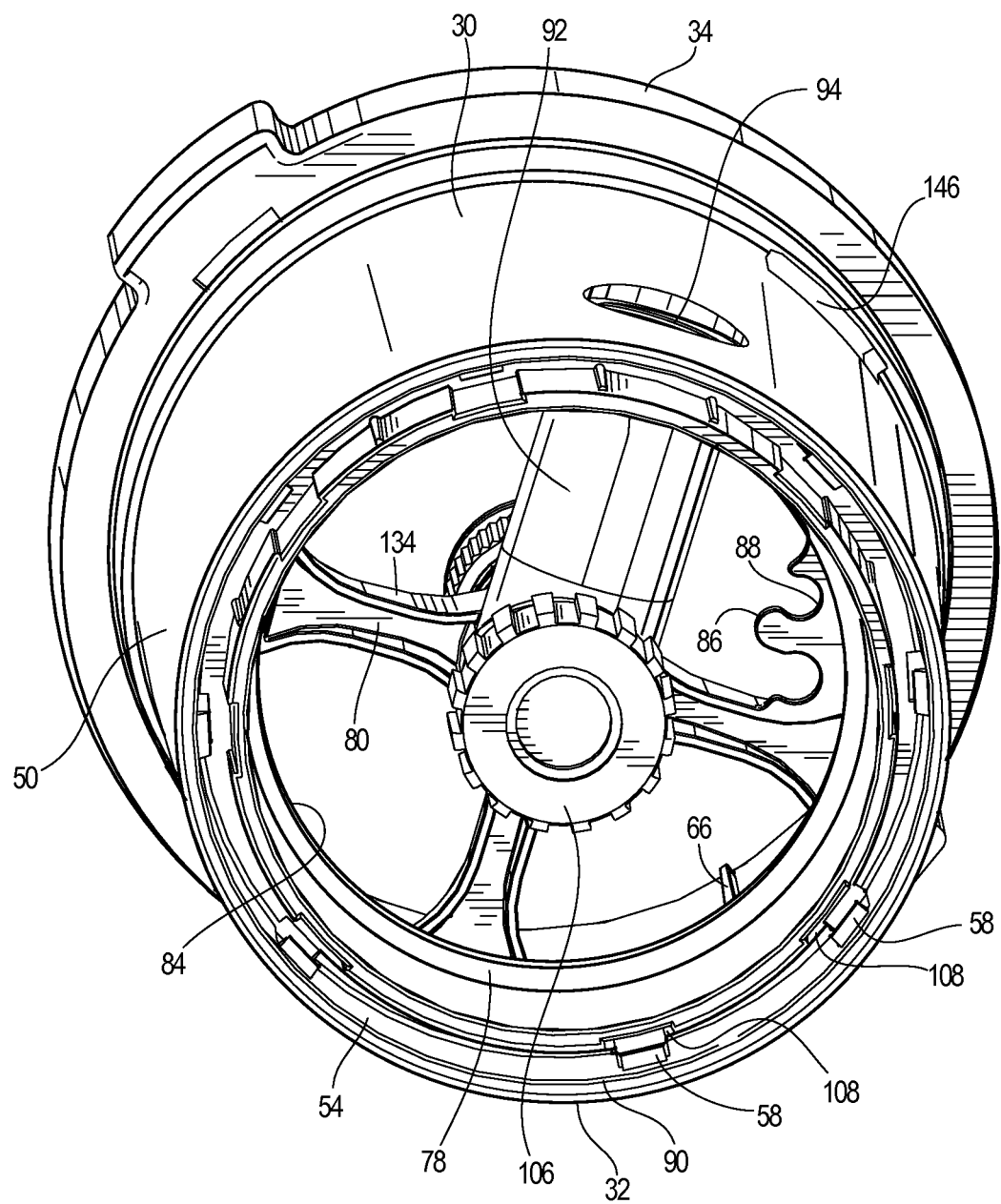
FIG. 4 is a lower perspective view of the grate-retaining housing of the root watering device of FIG. 1.

Referring to FIGS. 1-2, a root watering device 10 has an end assembly 12 on an upper end portion 14 of the system 10. The end assembly 12 is connected to a cylindrical porous body 16 that forms a lower end portion of the watering device 10. The watering device 10 provides water, air and nutrients to a sub-surface layer of soil for supply of these components to the roots of plants and trees. For this purpose, the watering device 10 is embedded or otherwise sunk into the ground proximate to the roots with the upper end portion 14 generally at or just below the ground surface or grade level. Because of the length of the device 10, and the device 10 being embedded in the soil, water, air and nutrients are able to reach a depth greater than surface application or exposure. The water also is not as readily susceptible to evaporation as when deposited on the surface for watering.

The watering device 10 is typically part of an irrigation system including a plurality of devices 10, where each plant or tree may be provided with one or more watering devices 10. A network of water distribution piping delivers water from a water source to the watering devices. Thus, the watering device 10 has a fluid supply pipe or line 20 that in turn connects to the network of distribution piping. The irrigation system preferably includes a control system for activating or deactivating the system.

In this embodiment, the fluid supply pipe 20 has an upper elbow 22 threaded to the end assembly 12, a lower elbow 24 for connection to a distribution pipe, and a flexible tube 26 attached to barbs 28 on the upper and lower elbows 22 and 24 (which may be provided in the form of a swing pipe assembly). Often, the distribution pipes are embedded in the ground before the watering devices 10 are placed into the ground or soil. It is very efficient to connect the upper elbow 22 to the end assembly 12 and the lower elbow 24 to the distribution pipe before the watering device 10 is placed in the ground.

Referring to FIGS. 1-6, the end assembly 12 has a housing 30 with an open lower end 32 to provide fluid to the porous body 16 and an upper end 34 covered by a recessed cap or grate 36 that has openings to allow fluid to bubble out and over the top 38 of the watering device 10 or to receive water, air and nutrients from the surface. Upper end 34 has a larger diameter compared to open lower end 32 in order to accommodate the cap 36, as will be discussed further herein. The grate-retaining housing 30 also defines an inlet passage 40 that receives fluid from the fluid supply pipe 20, an optional valve 42 fluidly connected to the inlet passage 40, and a fluid emitter 44, such as, for example, a bubbler that emits fluid to the housing which then flows down through the housing, and into the porous body 16. From the porous body 16, the fluid flows out one or both of the bottom end 46 of the porous body or through openings on a cylindrical mesh sidewall 48 forming the porous body 16. While in one embodiment the porous body 16 is kept empty of any soil or granular substances, alternatively the porous body 16 may be at least partially filled with a permeable material such as, for example, coarse gravel.

More specifically, the grate-retaining housing 30 has a cylindrical outer wall 50, although many other shapes are contemplated, such as, for example, non-cylindrical, polygonal, oval, elliptical, or any other irregular shape. The grate-retaining housing 30 and the porous body 16 generally define a longitudinal axis L and both the mesh sidewall 48 of the porous body and the outer wall 50 of the housing 30 generally extend around and generally parallel to the axis L in one form, and generally and cooperatively define an outer side surface 52 of the watering device 10. In this embodiment, the outer wall 50 has a length sufficient to laterally surround the sides of the valve 42 and the fluid emitter 44.

Figure 5:
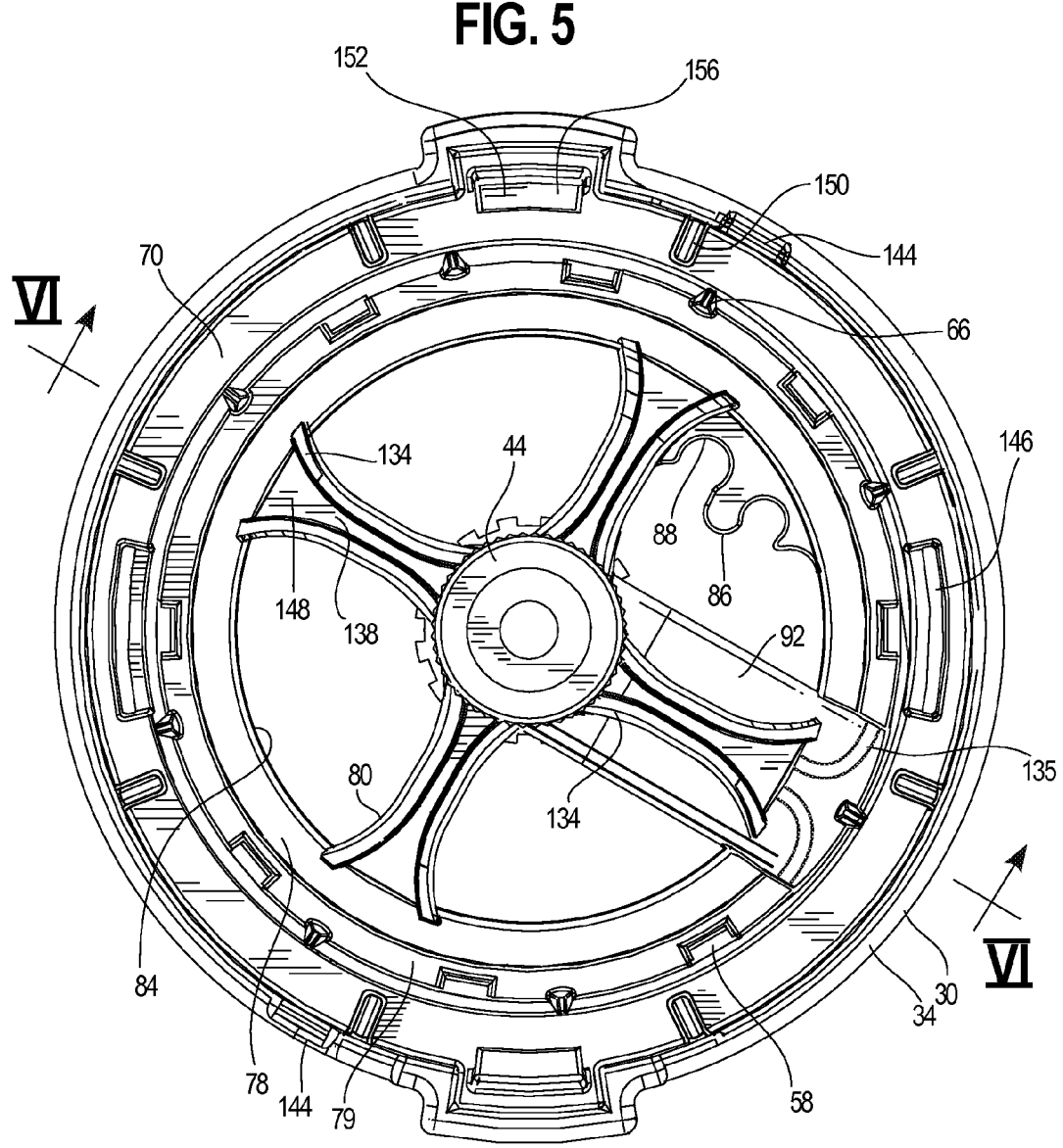
FIG. 5 is a top plan view of the grate-retaining housing of the root watering device of FIG. 1.

At the lower end 32 of the housing 30, the outer wall 50 cooperates with an inner skirt 90 to define an annular groove 54 that opens in the longitudinal direction downwardly to receive an upper rim portion 56 of the porous body 16. The outer wall 50 has circumferentially spaced and interiorly extending, hook or barb-shaped projections 58 (seen best in FIG. 4) for releasably engaging openings on the mesh sidewall 48 of the porous body 16, as shown in FIG. 5. The barbs 58 are shaped to facilitate insertion of the upper rim portion 56 into the groove 54, but resist removal of the upper rim portion 56 from the groove 54. Both the end assembly 12 and the porous body 16 may be made of polymers shaped by injection molding and that may permit sufficient flexibility to facilitate a simple snap-fit connection between the end assembly 12 and the porous body 16 using the projections 58.

The grate cap 36 is configured to be recessed within the upper end 34 of the grate-retaining housing 30 and has a longitudinally extending, cylindrical skirt 62 that is received within the outer wall 50 of the housing 30. The outer wall 50 has an interior surface 64 facing the grate cap skirt 62 when assembled and has interiorly extending and circumferentially spaced ribs 66 for engaging the cap skirt 62 with an interference fit. The grate cap 36 also includes a series of protrusions 68 (shown best in FIG. 2) extending radially outward from the skirt 62 to seat on an annular ledge 70 formed on the interior surface 64 of the outer wall 50. The ledge 70 supports protrusions 150 on which the lip 37 of the cap 36 rests.

The grate cap 36 is configured to snap into place and be held in place using retention clips 142 integrated with the grate-retaining housing 30. When the lip 37 of cap exerts a downward force on docking surfaces or protuberances 156, as would occur when placing cap 36 into the housing 30, the free ends 152 of retention clips 142 are consequently subjected to a radially outward, pivoting movement about their attached base 154. This causes retention clips 142 to deflect towards outer wall 50 of the grate-retaining housing 30, creating clearance between protuberances 156 and lip 37. When the top 38 of grate cap 36 passes below protuberances 156, retention clips 142 are biased to deflect back to their original position. The protuberances 156 now serve to hold cap 36 in place since cap 36 will be restricted from upward movement past the undeflected protuberances 156. Deflecting the retention clips 142 a sufficient amount will permit the cap 36 to be removed. An optional tool access notch 144, which would accommodate a grate cap removal tool, can be provided in the upper edge 34 of the grate-retaining housing 30 to provide leverage in removing the grate cap 36. It will be appreciated, however, that many other ways may be used to releasably secure the grate cap 36 relative to the grate-retaining housing 30 as long as soil, debris, or normal water pressure for such root watering devices cannot unintentionally remove the grate cap 36 from the grate-retaining housing 30.

Figure 6:
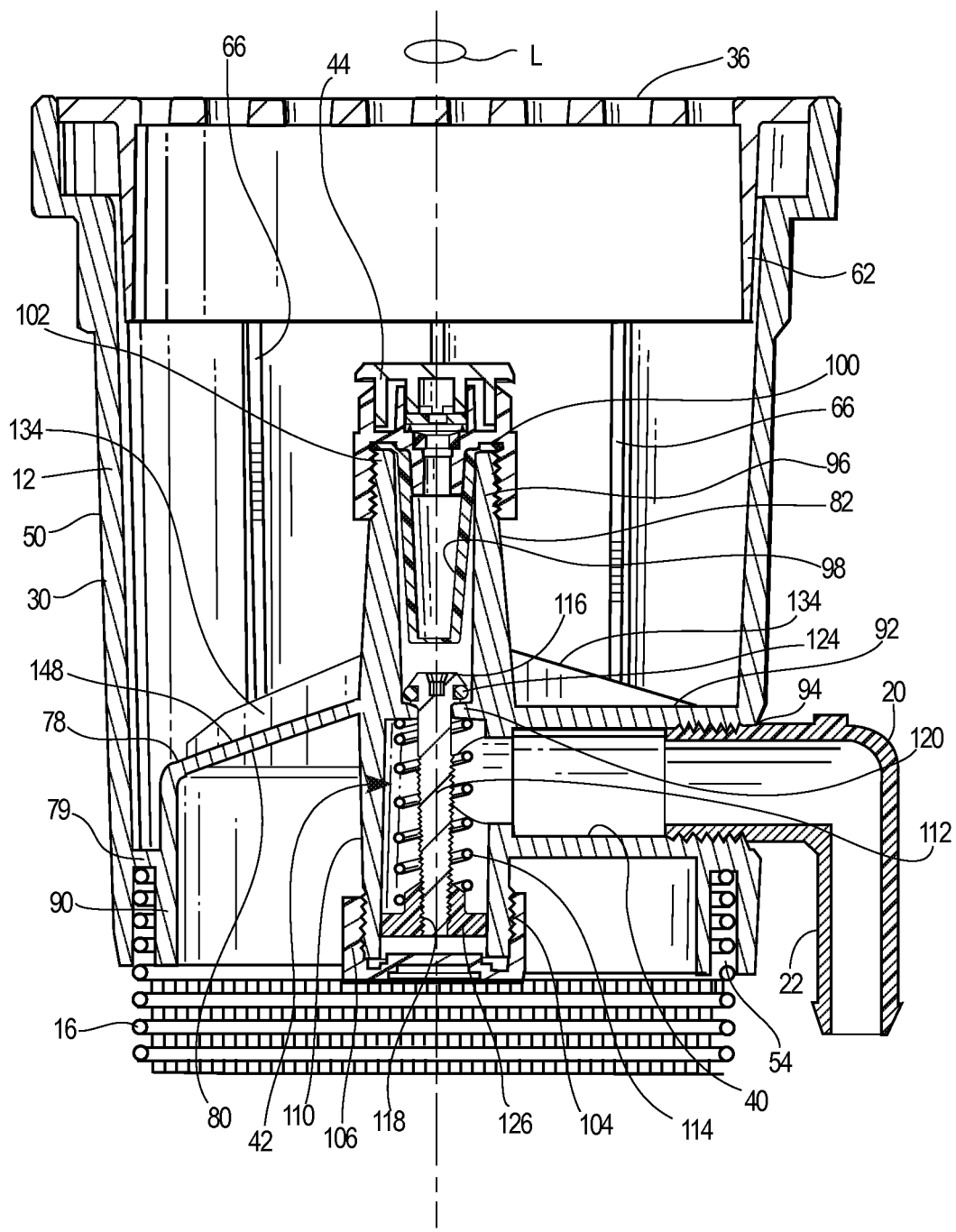
FIG. 6 is a cross-sectional view of the upper end portion of the root watering system of FIG. 1 taken along line VI-VI thereof.

Referring to FIGS. 3-6, the grate-retaining housing 30 has an integrally formed, annular reservoir 79 that extends radially inward from the interior surface 64 of the outer wall 50. The reservoir 79 is formed between an adjacent portion of the interior surface 64 of the outer wall 50, a bottom wall or ledge, and an upwardly extending edge of an annular reservoir containment wall 78, as shown in FIG. 6. The reservoir 79 contains a plurality of exits in the form of apertures 108 distributed around the reservoir 79 through which water can flow. A plurality of support spokes 80 extend radially inward at an upward slope from the reservoir containment wall 78 creating sloped surfaces 148. The spokes 80 are integrally formed with, and terminate at, a generally coaxial and longitudinally extending central hub 82 that supports the fluid emitter 44. The spokes 80 support raised sidewalls 134 which combined with slopes 148 form water delivery channels 138 for containing and directing the water or other fluid for purposes of elevated irrigation, as will be discussed herein. The spokes 80 are generally uniformly and circumferentially spaced about longitudinal axis L and are separated from each other by arcuate spaces 84. The spaces 84 permit substantially unobstructed fluid flow from near the upper end 34 of the grate-retaining housing 30, down to the lower end 32 of the grate-retaining housing 30, and into the porous body 16. At least one of the spaces 84 is lined with a finger 86 forming indents 88 for receiving and holding alternative watering devices such as thin water supply tube that may extend through the lower or upper ends and 34 of the grate-retaining housing 30. The grate-retaining housing 30 contains outlet ports 146 through which additional plumbing for drip lines can pass, as will be discussed in greater detail below.

In this embodiment, three spokes 80 are spaced generally 90 degrees apart. In between two of the spokes 80, and generally 90 degrees from each spoke of the two spokes, the grate-retaining housing 30 integrally defines the inlet passage 40 which extends transversely or laterally relative to axis L. The inlet passage 40 interconnects the hub 82 and the outer wall 50. The hub 82 and the inlet passage 40 intersect to form a T-shape. The inlet passage 40 is formed by a cylindrical wall 92 and has an opening 94 at the outer wall 50 for connection to the fluid supply pipe 20. The inlet passage 40 supports raised sidewalls 134 and a plurality of grooves 135 which function as water delivery channels.

The fluid emitter 44 is threaded to an upper threaded portion 96 of the hub 82 and over a filter 98 that extends into the hub 82. The filter 98 has a lip 100 clamped between an upper rim 102 of the hub 82 and the fluid emitter 44 for securing the filter 98 in the hub 82. The lower threaded portion 104 of the hub 82 is enclosed by a threaded cap 106. With this configuration, the inlet passage 40 directs fluid from the supply pipe 20 and into the hub 82. The fluid then flows up through the filter 98 and into the fluid emitter 44. The fluid emitter 44 can be of the pressure compensating/flow control type, include a pressure compensation disc 160 and a washer seat 158. The pressure compensation disc 160 can be used to regulate the pressure and thus flow rate of fluid for emission by the fluid emitter 44. The washer seat 158 can have a central opening that can be sized based upon the desired flow rate. The pressure compensation disc 160 also has a central opening and is configured such that the central opening can constrict in response to increased fluid pressures. The pressure compensation disc 160 and washer seat 158 function to provide consistent flow rates over varied pressures.

As an option, the end assembly 82 may include the valve 42 to protect the fluid emitter 44 or other parts from damage commonly caused by debris laden non-potable water entering the emitting orifices of the fluid emitter 44. The hub 82 forms an outer, cylindrical wall 110 for the valve 42 so that the valve 42 is at least partially integrally formed by the grate-retaining housing 30. The valve 42 also has an elongate member or stem 112 longitudinally disposed within the wall 110 and that is biased to a closed position (as shown in FIG. 5) by a spring 114. In one form, the stem 112 is a threaded screw like component with a widened head 116 and threaded end 118 opposite the head. The wall 110 has an integrally formed and interiorly extending, annular flange 120 that forms a valve seat that is engaged by an O-ring 124 when the valve 42 is closed, or, alternatively, the O-ring 124 can engage adjacent tapered portions of the internal surfaces of the wall 110 above the flange 120. The O-ring 124 is mounted on the stem 112 underneath the head 116 and above the flange 120 so that the bias of the spring 114 causes the head 116 to press the O-ring 124 downward against the annular flange 120 to close the valve 42.

To bias the valve 42 closed, the spring 114 is compressed between the annular flange 120 and a retaining nut 126 that is threaded onto the threaded end 118 of the stem 112 and that moves longitudinally with the stem 112. The retaining nut 126 has oppositely extending wings 128 that when assembled are disposed within longitudinally extending, opposite internal grooves. The grooves are defined within the cylindrical wall 110 of hub 82 to rotationally fix the retaining nut 126 while providing sufficient clearance for the retaining nut to move longitudinally with the stem 112.

So configured, fluid received from the inlet passage 40 enters the hub 82 and presses upward against the underside of the widened head 116, carrying the O-ring 124, and upward from beneath the retaining nut 126 in an area between the retaining nut 126 and the cap 106. Once sufficient fluid pressure is present to overcome the bias force of the spring 114, the head 116 is lifted upward and off of the flange 120, which compresses the spring 114 and opens the valve 42. Fluid is then allowed to flow through to the fluid emitter 44 (or other device attached to the hub 82). Once fluid pressure is reduced below a certain predetermined threshold, the O-ring 124 and the head 116 fall back down against the annular flange 120 to reclose the valve 42. This prevents backflow into the water supply piping. Accordingly, foreign matter is not able to be pulled back into the irrigation emitting device.

In operation, water flows through the network of distribution piping, through the fluid supply pipe 20, and into the integral inlet passage 40 of the end assembly 12. The water then enters the hub 82. If the valve 42 is present, the hub 82 fills until sufficient fluid pressure in the hub 82 opens the valve 42 by forcing the stem head 116 of the stem 112 off of the flange 120. Water then flows through filter 98, and flows out of the fluid emitter 44. The water then either passes out of the watering device 10 through the grate cap 36, flows through the grate-retaining housing 30, or flows onto inclined ramps 148. Water falling from the fluid emitter 44 that passes through grate-retaining housing 30 flows into the porous body 16. Water in the porous body 16 then either flows out of the bottom end 46 of the porous body 16 or through the mesh sidewall of the porous body 16 where it is deposited in the vicinity of plant roots.

Water falling from the fluid emitter 44 that falls onto slopes 148 or grooves 135 subsequently travels through water delivery channels 138. The channels 138 function to move water radially outward toward the inner reservoir 78 of the grate-retaining housing 30 allowing water to pass through the apertures 108 for irrigation of adjacent areas. This advantageously provides irrigation toward the upper end portion 14 of the root watering system 10. Without water delivery channels 138, the majority of the water will fall toward the bottom end 46 of the porous body 16 until sufficient water fills the body 16, which may not occur depending upon soil types and installation practices. Since the valve 42 is directly integrated into the end assembly 12 and the inlet passage 40 is integrally defined by the end assembly 12 for receiving fluid for the watering device 10, the end assembly 12 can be completely assembled, including placing the stem 112 in the conduit 82, before connecting the end assembly 12 to the porous body 16. Then, the completed end assembly 12 can be mounted on the porous body 16 anywhere or at any time whether in the field, while the porous body 16 is already in the ground, or in a manufacturing plant.

This also results in easier disassembly of the watering device 10. Since the fluid supply conduit 20 is connected to the inlet passage 40 for providing fluid to the end assembly 12, the fluid supply line 20 extends entirely exteriorly of the porous body without extending through the porous body. This permits the end assembly 12 or grate-retaining housing 30 to be disconnected from the porous body 16 without the need for digging out the entire device 10 and disconnecting conduits at a conduit joint within the porous body 16. Thus, the end assembly 12 can be easily removed from the porous body 16 to repair, adjust, replace, or clean the end assembly 12, even while the porous body 16 is still in the ground.

For adjustment of the valve 42, the stem head 116 also has a drive head (slotted, hex, or otherwise) so that it can be adjusted by a corresponding configured tool without removing the stem 112 from the end assembly 12. This is accomplished by deflecting retention clips 142, removing the grate cap 36, and then removing the fluid emitter 44 and filter 98 from the conduit 82 to obtain access to the head 116 of the stem 112. A tool, such as a screw driver, can then be inserted through the upper end 34 of the grate-retaining housing 30 and into conduit 82 to engage the head 116. Turning the head 116, in one example, will change the amount spring 114 is compressed which in turn changes the amount of fluid pressure that is required to open the valve 42. Opposite direction turning of the stem 112 will disengage the retaining nut 126 from the stem 112 so that the stem 112 can be entirely removed from the end assembly 12. This adjustment or removal can be performed whether or not the end assembly 12 is connected to the porous body 16 and whether or not the end assembly is in the ground. If the end assembly 12 is in the ground, soil just directly above the watering device 10 needs to be removed for access to the inside of the watering device and the stem 112. The reduction in parts due to the integrally formed conduits 82 and 40 and valve 42 on the end assembly 12 as well as the direct connection of the inlet passage 40 to the fluid supply line 20 resulting in a simplified assembly of the watering device 10 which provides a significant reduction in costs due to reduced parts and labor.

Improved in this embodiment is the arrangement of recessing the grate cap 36 at least partially within grate-retaining housing 30. The raised lip 141 on the housing 30 provides more protection of the grate cap 36 by providing a buffer between the environment and lateral edges of the grate cap 36. The addition of integrated retention clips 142 reduces costs by eliminating separate retention components, simplifying installation and removal, and improving vandal resistance. The optional addition of the notch 144 can ease grate cap 36 removal. The addition of protrusions 150 on ledge 70 functions to keep lip 37 of the grate cap 36 elevated off of ledge 70 of the housing 30. This can prevent the accumulation of debris between the lip 37 and ledge 70 since debris tends to accumulate where two surfaces are flush and provides a flush path for removal of such debris.

Figure 7:
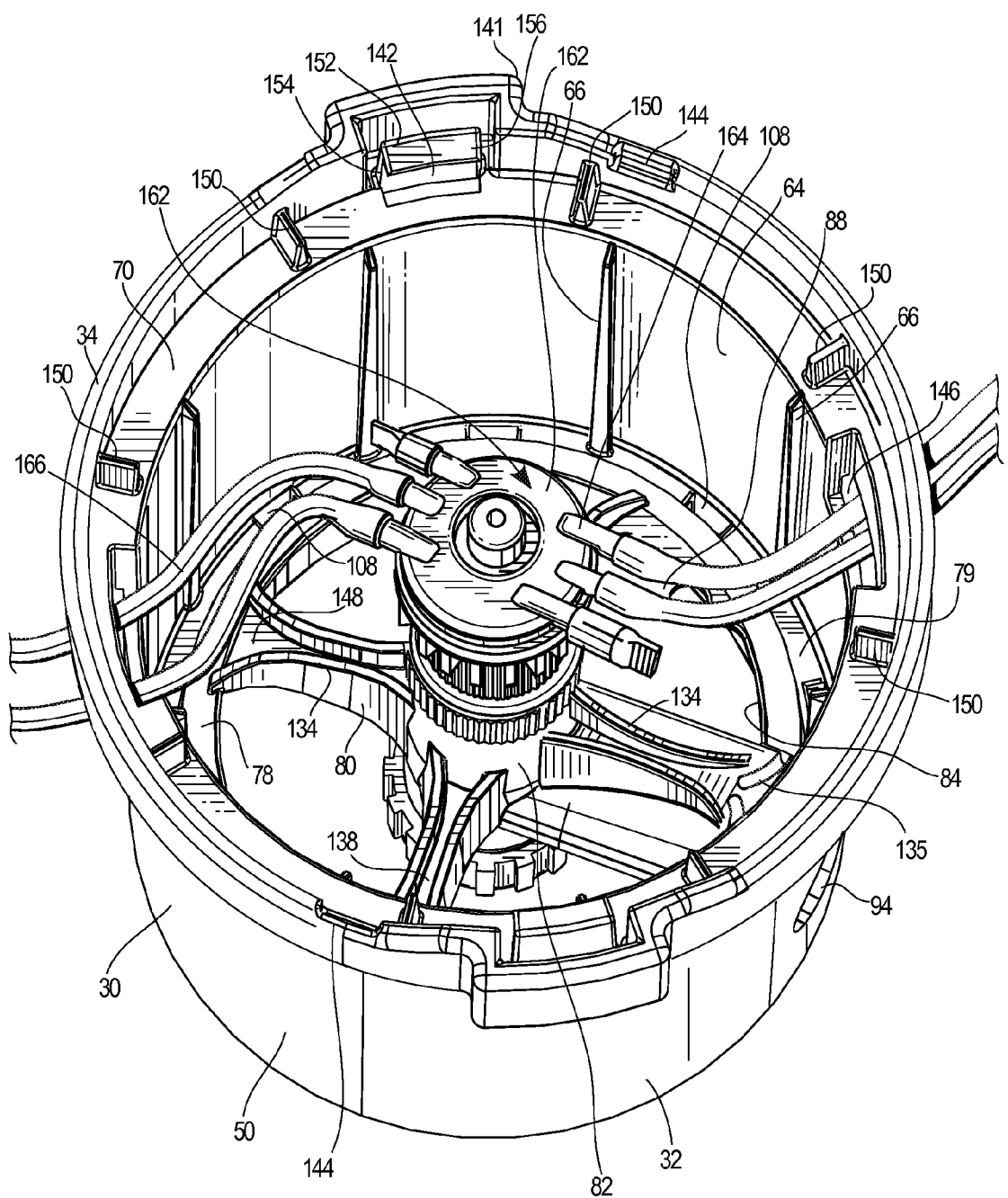
FIG. 7 is an upper perspective view of an alternative grate-retaining housing for a root watering device showing a distribution manifold mounted therein for distributing fluid through a plurality of flexible irrigation tubing lines extending through openings in a sidewall of the housing.

In certain circumstances, it can be desirable to connect a water distribution manifold 162 to the central hub 82 and use the manifold 162 to distribute water to multiple drip tubing lines 166. The water distribution manifold may be of the pressure compensating/flow control type, incorporating similar structures as the above-discussed fluid emitter 44. The embodiment in FIG. 7 shows manifold 162 with six ports 164 through which water flow can be divided. Lines 166 are connected to four of the six available ports 164. The manifold 162 can also have one line configured to drip water in the grate-retaining housing 30 for irrigation using the root watering device 10. To facilitate connection to drip irrigation devices external to the root watering device 10, one or more outlet ports 146 can be disposed circumferentially about the upper end 34 of the grate-retaining housing 30. In this embodiment two ports 146 are spaced 180 degrees from each other and 90 degrees from retention clips 142. Drip or other flexible irrigation tubing lines 166 pass through drip line subsurface outlet ports 146. The ports 146 in this embodiment are rectangular in shape and are sized so that they do not interfere with ribs 66 or protrusions 150, however the ports 146 can be any size or shape so as to accommodate drip lines 166.

While the foregoing description is with respect to specific examples, those skilled in the art will appreciate that there are numerous variations of the above that fall within the scope of the concepts described herein and the appended claims. For example, the optional valve 42 can be omitted, or can be incorporated as an additional component between the hub 82 and a fluid emitting device.

The invention claimed is:
1. A deep root watering unit comprising:
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant;
a grate-retaining housing mounted at an upper end of said sleeve member, said grate-retaining housing defining an internal chamber, and further including a mount for sup- porting an irrigation water dispensing device and an inwardly extending ledge adjacent an upper end portion of the housing; and a perforated grate cap removably mounted on the upper end portion of said grate-retaining housing in substantially spaced relation from the ledge such that a flush path for debris is formed between the ledge and the grate cap.

2. The deep root watering unit of claim 1, wherein the upper end portion of said grate-retaining housing has at least one integrally formed retention clip for securing the grate cap to the grate-retaining housing.

3. The deep root watering unit of claim 2, wherein the retention clip is configured to resiliently flex outwardly to permit insertion and removal of the grate cap.

4. The deep root watering unit of claim 3, wherein each of the at least one retention clips is configured such that insertion of the grate cap causes the retention clip to resiliently flex outwardly.

5. The deep root watering unit of claim 2, wherein a perimeter shield is disposed outwardly from each of the at least one retention clips.

6. The deep root watering unit of claim 5, wherein the upper end portion of the grate-retaining housing terminates at a peripheral lip, the peripheral lip having an upwardly extending portion defining the perimeter shield.

7. The deep root watering unit of claim 6, wherein the peripheral lip includes a notch for insertion of a tool for facilitating removal of the grate cap.

8. The deep root watering unit of claim 1, wherein the grate cap includes a generally planar grate surface with downwardly extending ribs configured to support the grate surface in spaced relation from the ledge and a skirt to facilitate an interference fit with the grate-retention housing.

9. A deep root watering unit comprising:
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant; and
a grate-retaining housing mounted at an upper end of said sleeve member, said grate-retaining housing having an outer surrounding wall defining an internal chamber, and further including a mount for supporting an irrigation water dispensing device in spaced relation from the outer surrounding wall, and at least one inclined ramp, each of the inclined ramps configured to direct fluid outwardly for flow into an annular reservoir of the grate-retaining housing and through at least one exit of the reservoir for irrigation proximate the housing.

10. The deep root watering unit of claim 9, wherein the mount is supported by a plurality of spokes projecting inwardly from the outer surrounding wall of the housing to the mount, the spokes being in spaced-apart relation to define a plurality of flow ports therebetween, and wherein one of the spokes defines the inclined ramp.

11. The deep root watering unit of claim 10, wherein the inclined ramp is configured as a channel for containing and directing fluid.

12. The deep root watering unit of claim 11, wherein the grate-retaining housing includes a plurality of the inclined ramps, the housing has a ledge extending inwardly from the outer surrounding wall to define the reservoir and having apertures formed therein to define the exits of the reservoir.

13. The deep root watering unit of claim 12, wherein the inclined ramps are misaligned with the apertures.

14. The deep root watering unit of claim 12, wherein the apertures are aligned with the sleeve to wick the water downwardly.

15. The deep root watering unit of claim 14, wherein the sleeve is received within an annular recess on an opposite side of the ledge from the reservoir.

16. The deep root watering unit of claim 9, further comprising a perforated grate cap removably mounted on the upper end portion of said grate-retaining housing in substantially spaced relation from the ledge such that a flush path for debris is formed between the ledge and the grate cap, the upper end portion of said grate-retaining housing having at least one integrally formed retention clip for securing the grate cap to the grate-retaining housing.

17. A deep root watering unit comprising:
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant; and
a grate-retaining housing mounted at an upper end of said sleeve member, said grate-retaining housing having an outer surrounding wall defining an internal chamber and further including a mount suitable for supporting an irrigation water dispensing manifold and supplying fluid through the mount to the manifold, in combination with an irrigation water dispensing manifold supported by the mount, and at least one opening formed in the outer surrounding wall suitable for flexible irrigation tubing to extend through for connecting the manifold with devices external to the unit.

18. The deep root watering unit of claim 17, wherein the manifold is fluidly coupled to the mount and has a plurality of outlet ports in fluid communication with the inlet port.

19. A deep root watering unit comprising:
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant; and
a grate-retaining housing mounted at an upper end of said sleeve member, said grate-retaining housing having an outer surrounding wall defining an internal chamber and further including a mount suitable for supporting an irrigation water dispensing manifold and supplying fluid through the mount to the manifold, and at least one opening formed in the outer surrounding wall suitable for flexible irrigation tubing to extend through for connecting the manifold with devices external to the unit;
further comprising a perforated grate cap removably mounted on the upper end portion of said grate-retaining housing in substantially spaced relation from an internal ledge such that a flush path for debris is formed between the ledge and the grate cap, the upper end portion of said grate-retaining housing having at least one integrally formed retention clip for securing the grate cap to the grate-retaining housing.

20. A deep root watering unit comprising:
an elongated hollow sleeve member adapted for in-ground placement to extend generally vertically at a position adjacent roots of a selected plant, said sleeve member having a plurality of water flow openings formed therein for passage of water from within said sleeve member to surrounding soil to irrigate the selected plant; and a grate-retaining housing mounted at an upper end of said sleeve member, said grate-retaining housing having an outer surrounding wall defining an internal chamber and further including a mount suitable for supporting an irrigation water dispensing manifold and supplying fluid through the mount to the manifold, and at least one opening formed in the outer surrounding wall suitable for flexible irrigation tubing to extend through for connecting the manifold with devices external to the unit;

further comprising means for elevated irrigation adjacent the housing.

* * * * *